United States Patent
Horiuchi

(10) Patent No.: US 6,926,995 B2
(45) Date of Patent: Aug. 9, 2005

(54) FUEL CELL SEPARATORS AND SOLID POLYMER FUEL CELLS

(75) Inventor: Ayumi Horiuchi, Okazaki (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 10/636,695

(22) Filed: Aug. 8, 2003

(65) Prior Publication Data

US 2004/0028987 A1 Feb. 12, 2004

(30) Foreign Application Priority Data

Aug. 9, 2002 (JP) ........................................ 2002-233697

(51) Int. Cl.[7] .............................. H01M 2/14; H01M 2/00
(52) U.S. Cl. .......................................... 429/129; 429/34
(58) Field of Search .......................... 429/30, 129, 142, 429/144, 145

(56) References Cited

U.S. PATENT DOCUMENTS

| | | | | |
|---|---|---|---|---|
| 4,767,680 A | * | 8/1988 | Hijikata et al. | 429/39 |
| 5,445,904 A | * | 8/1995 | Kaufman | 429/34 |
| 2003/0054221 A1 | * | 3/2003 | Saito et al. | 429/34 |
| 2003/0194594 A1 | * | 10/2003 | Nakajima et al. | 429/34 |
| 2004/0028981 A1 | | 2/2004 | Horiuchi et al. | 429/34 |
| 2004/0041294 A1 | | 3/2004 | Horiuchi et al. | 264/109 |

FOREIGN PATENT DOCUMENTS

| | | |
|---|---|---|
| AT | 389 020 B | 8/1986 |
| JP | 8-130024 A | 5/1996 |
| JP | 8-130025 A | 5/1996 |
| JP | 10-3932 A | 1/1998 |
| JP | 2000-251903 A | 9/2000 |
| JP | 2001-93539 A | 4/2001 |
| JP | 2002-110189 A | 4/2002 |

* cited by examiner

*Primary Examiner*—Patrick Joseph Ryan
*Assistant Examiner*—Melissa Austin
(74) *Attorney, Agent, or Firm*—Birch, Stewart, Kolasch & Birch, LLP

(57) ABSTRACT

A separator for use in solid polymer fuel cells has porous areas, dense areas and gas flow channels. The flow channels are defined by flow channel surfaces, some or all of which are formed in the porous areas. The gas flow channels are not readily obstructed by water that forms during power generation. The separator has an adequate strength for use in fuel cells and a low contact resistance.

4 Claims, 5 Drawing Sheets

FUEL CELL SEPARATORS AND SOLID POLYMER FUEL CELLS

BACKGROUND OF THE INVENTION

1. Field of the Invention

The present invention relates to fuel cell separators and to solid polymer fuel cells which include such separators.

2. Prior Art

Fuel cells are devices which, when supplied with a fuel such as hydrogen and with atmospheric oxygen, cause the fuel and oxygen to react electrochemically, producing water and directly generating electricity. Because fuel cells are capable of achieving a high fuel-to-energy conversion efficiency and are environmentally friendly, they are being developed for a variety of applications, including small-scale local power generation, household power generation, simple power supplies for isolated facilities such as campgrounds, mobile power supplies such as for automobiles and small boats, and power supplies for satellites and space development.

Such fuel cells, and particularly solid polymer fuel cells, are built in the form of modules composed of a stack of at least several tens of unit cells. Each unit cell has a pair of plate-like separators with a plurality of ribs on either side thereof that define channels for the flow of gases such as hydrogen and oxygen. Disposed between the pair of separators in the unit cell are a solid polymer electrolyte membrane and gas diffusing electrodes made of carbon paper.

The role of the fuel cell separators is to confer each unit cell with electrical conductivity, to provide flow channels for the supply of fuel and air (oxygen) to the unit cells, and to serve as a separating or boundary membrane between adjacent unit cells. Qualities required of the separators include high electrical conductivity, high gas impermeability, electrochemical stability and hydrophilic properties.

In such separators, the water that forms during power generation often obstructs the flow channels in the separator, lowering the power generating efficiency. A number of efforts have been made to overcome this problem. These include the following prior-art methods:

(1) incorporating a hydrophilic substance into the separator base (JP-A 10-3932),
(2) administering a hydrophilic treatment to the separator surface (JP-A 8-130024, JP-A 8-130025, JP-A 2000-251903, JP-A 2001-93539),
(3) making the overall separator or the flow channel surfaces thereof of expanded graphite (JP-A 2002-110189), and
(4) making the overall separator of a porous material (Austrian Patent No. 389,020).

In above prior-art method (1), efficient migration of the hydrophilic substance to the flow channel surfaces is difficult to achieve. As a result, hydrophilic treatment is not adequately effective and the hydrophilic substance used dissolves out of the separator as an impurity.

Prior-art method (2) above requires a post-treatment step following hydrophilic treatment. This increases the number of production steps and makes the work associated with production more complicated. In addition, the contact resistance of the separator rises due to hydrophilic treatment, lowering the performance of the fuel cell.

In prior-art method (3), the shape of the separator deforms when the units cells are clamped together during assembly of the fuel cell stack. Moreover, because the separator is made at least in part of expanded graphite, it contains acid from the acid treatment carried out during production of the expanded graphite. This acid promotes the elution of impurities and also has an adverse effect on the electrolyte membrane.

In prior-art method (4), when the porous material is porous sintered carbon, the costs associated with machining the grooves rise and the yield of the machining operation falls. On the other hand, when the porous material is porous molded carbon, sufficient strength cannot be achieved.

SUMMARY OF THE INVENTION

It is therefore one object of the invention to provide fuel cell separators in which the gas flow channels are not easily obstructed by the water that forms during power generation and which are thus capable of efficiently generating electricity, and which moreover have a sufficient strength and a low contact resistance. Another object of the invention is to provide solid polymer fuel cells which include such fuel cell separators.

We have discovered that fuel cell separators having porous areas, dense areas and gas flow channels, wherein the flow channels are defined by flow channel inner surfaces, some or all of which are formed in porous areas of the separator, are not readily subject to obstruction of the flow channels by water that forms during power generation, are endowed with sufficient strength for use in fuel cells and also have a low contact resistance.

Accordingly, in a first aspect, the invention provides a fuel cell separator having porous areas, dense areas and gas flow channels, wherein the flow channels are defined by flow channel surfaces, some or all of which are formed in the porous areas. The porous areas have a porosity of preferably 5 to 50%, and typically are hydrophilically treated.

In a second aspect, the invention provides a solid polymer fuel cell having a plurality of stacked unit cells, each unit cell being composed of a solid polymer membrane, a pair of electrodes disposed on either side of the polymer membrane, and a pair of separators disposed on either side of the pair of electrodes such as to form flow channels for supplying and removing gases. Some or all of the separators within the fuel cell are fuel cell separators according to the foregoing first aspect of the invention.

BRIEF DESCRIPTION OF THE DIAGRAMS

FIG. 1 illustrates a powdered material charging device such as may be used according to one embodiment of the invention. FIG. 1b is a sectional view taken along line b—b in FIG. 1a.

DETAILED DESCRIPTION OF THE INVENTION

Figure 1A:
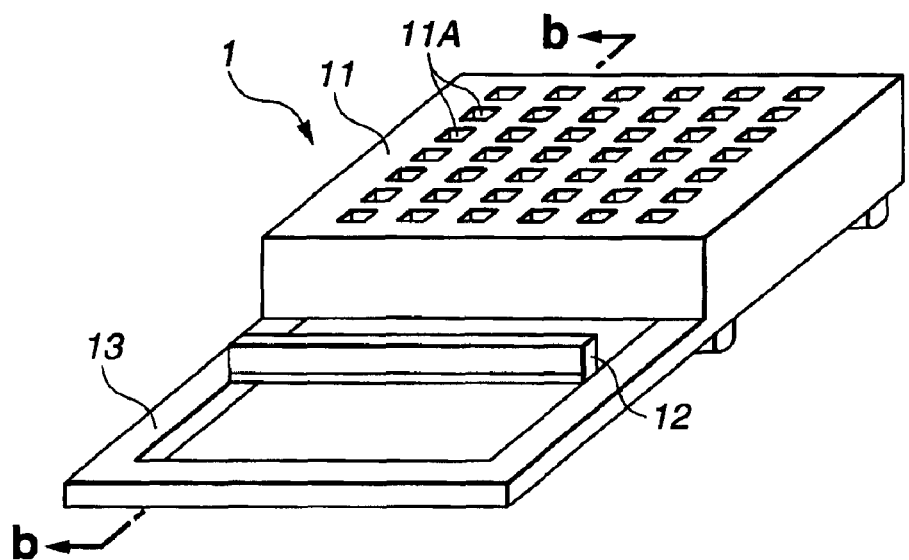
FIG. 1a is a perspective view of the device.

The objects, features and advantages of the invention will become more apparent from the following detailed description, taken in conjunction with the foregoing diagrams.

As noted above, the fuel cell separator of the invention has porous areas, dense areas and gas flow channels, wherein the flow channels are defined by flow channel surfaces, some or all of which are formed in the porous areas.

The materials of which the porous areas and the dense areas are made may be any commonly employed in the production of fuel cell separators, including materials prepared by subjecting a mixture of electrically conductive powder and resin to a compounding operation.

The conductive powder is not subject to any particular limitation. Illustrative examples include natural graphite and synthetic graphite. The conductive powder has an average particle size in a range of typically about 10 to 100 μm, and preferably about 20 to 60 μm.

The resin may be suitably selected from among thermoset resins, thermoplastic resins and other resins commonly used in fuel cell separators. Specific examples of resins that may be used include phenolic resins, epoxy resins, acrylic resins, melamine resins, polyamide resins, polyamideimide resins, polyetherimide resins and phenoxy resins. If necessary, these resins may be heat treated.

No limitation is imposed on the proportions in which these respective components are blended, although it is desirable for the powdered molding material to include, per 100 parts thereof: 50 to 99 parts by weight, and especially 65 to 90 parts by weight, of the conductive powder; and 1 to 50 parts by weight, and especially 5 to 20 parts by weight, of the resin.

These blended components are generally used after being subjected to a compounding operation carried out by any suitable method. Blended components that have been stirred, granulated and dried by known methods may be used, although it is preferable to use as the powdered molding material a blend which has been screened to prevent secondary agglomeration and adjusted to a specific particle size.

If necessary, the powdered molding material may include also an inorganic filler such as carbon fibers, other carbonaceous materials or activated alumina in an amount of 0.1 to 20 parts by weight, and preferably 1 to 10 parts by weight, per 100 parts by weight of the overall powdered material.

Separators having porous areas and dense areas may be obtained from such powdered molding materials by, for example, separately compounding a powdered material for porous areas and a powdered material for dense areas. In such a case, it is preferable for the powdered material intended for porous areas to have a smaller average particle size than the powdered material intended for dense areas. Typically, the powdered material for porous areas has an average particle size of 10 μm to 1.0 mm, and preferably 100 μm to 0.8 mm, whereas the powdered material for dense areas has an average particle size of 100 μm to 2.0 mm, and preferably 300 μm to 1.0 mm. It is also advantageous for the powdered material for porous areas to be bulkier than the powdered material for dense areas. Typically, the powdered material for porous areas has a bulk density of 0.1 to 0.5 g/cm$^3$, and especially 0.3 to 0.5 g/cm$^3$, whereas the powdered material for dense areas has a bulk density of 0.3 to 1.0 g/cm$^3$, and preferably 0.4 to 0.8 g/cm$^3$.

When the fuel cell separator is molded such as with a compression mold, by using one type of powdered material for the dense areas and using a different type of powdered material for the porous areas, it is possible to control the degree of pore formation in the respective areas after molding, thus enabling a fuel cell separator having porous areas and dense areas to be easily obtained.

A number of specific techniques may be employed to prepare one type of powdered material for porous areas and a different type of powdered material for dense areas. One such method involves the use of flake graphite as the conductive powder in the powdered material for dense areas and the use of another type of graphite such as synthetic graphite as the conductive powder in the powdered material for porous areas. In another method, carbon having a relatively large specific surface area is included in the powdered material for the porous areas in an amount of 0.1 to 30 parts by weight, and preferably 1 to 10 parts by weight, per 100 parts by weight of the overall powdered material. In yet another method, an organic or inorganic fibrous component, possibly even whiskers, is included in the powdered material for porous areas in an amount of 0.1 to 20 parts by weight, and preferably 1 to 10 parts by weight. In still another method, the amount of resin in the powdered material for dense areas is made 1 to 20 parts by weight, and preferably 3 to 10 parts by weight, higher than in the powdered material for porous areas.

The porous areas in the fuel cell separator have a porosity of preferably 5 to 50%, and most preferably 10 to 30%. At a porosity of less than 5%, the ability to absorb the water that forms during power generation decreases, which may result in obstruction of the gas flow channels. On the other hand, at a porosity of more than 50%, precise formation of the channel shape may be impossible.

No particular limitation is imposed on the porosity of the dense areas, provided they have a lower porosity than the porous areas. To ensure that the fuel cell separator has a sufficient strength, it is desirable for the dense areas to have a low porosity, with a porosity of 0% being especially preferred.

It is advantageous for the porous areas to have a pore diameter of 0.01 to 50 μm, and preferably 0.1 to 10 μm. At a pore diameter smaller than 0.01 μm, water produced during power generation by the fuel cell passes through the separator with greater difficulty and may obstruct the gas flow channels. On the other hand, at a pore diameter larger than 50 μm, precise formation of the channel shape may not be possible.

The porous areas may be subjected to hydrophilic treatment. Such treatment increases the hydrophilic properties of the gas flow channels on the separator, making it possible to effectively prevent obstruction of the gas flow channels by water produced during power generation.

Any suitable known hydrophilic treatment method may be used for this purpose. One such method is to include 0.1 to 20 parts by weight, and particularly 1 to 10 parts by weight, of a metal oxide such as alumina or silica, a hydrophilic resin such as a water-soluble epoxy resin, or some other type of hydrophilic substance such as activated carbon per 100 parts by weight of the overall powdered material for the porous areas. Another suitable method is to apply the above metal oxide or hydrophilic resin to porous areas (the gas flow channel surfaces) of the molded fuel cell separator so as to form thereon a hydrophilic coat.

Yet another method is to coat or impregnate the separator with a metal oxide-containing hydrophilic resin, then cure the resin by the application of heat. A still further method that may be used is to mold a separator using a powdered molding material which contains 1 to 20 parts by weight of the above metal oxide per 100 parts by weight of the overall powdered material for porous areas, additionally coat or impregnate the resulting molded separator with the above-described hydrophilic resin, then cure the resin. In this last case, it is preferable to use a water-soluble epoxy resin as the hydrophilic resin.

Any suitable molding process, such as compression molding, injection molding, two-color injection molding, transfer molding or insert molding, may be used to manufacture the fuel cell separator of the present invention, although compression molding is preferred because of the ease with which the porosity can be adjusted within the appropriate range.

These various molding processes may be carried out using the above-described powdered molding material in a powdery or granular form, or after it has been preformed into a sheet.

The pressure applied during compression molding is not subject to any particular limitation, and may be set as appropriate for the desired porosity and other properties of the separator being manufactured. The molding pressure is generally from 0.098 to 19.6 MPa, preferably from 0.98 to 14.7 MPa, and most preferably from 1.96 to 9.8 MPa. At a molding pressure of less than 0.098 MPa, a strength sufficient to maintain the shape of the fuel cell separator may not be achieved. On the other hand, at a pressure greater than 19.6 MPa, strain may arise in the molding machine and mold, possibly lowering the planar and dimensional precision of the resulting fuel cell separator. In addition, pores may become filled, increasing the possibility that porous areas will not form in the separator.

If compression molding is carried out using a powdered material, any suitable method may be used to charge the powdered material into the mold. For instance, use can be made of a charging device 1 like that shown in FIG. 1.

Referring to FIG. 1, the powdered material charging device 1 has a charging member 11, a slide plate 12 situated below the charging member 11, and a base 13 which is integrally molded with the charging member 11 and forms a border that encloses the slide plate 12.

The charging member 11 has formed therein charging holes 11A of substantially rectangular shape, which holes 11A are arranged as a matrix of evenly spaced rows and columns.

The charging holes 11A pass vertically through the charging member 11 and are open at the bottom thereof. The holes 11A have a bore which can be selected as appropriate for the separator to be manufactured.

Figure 1B:
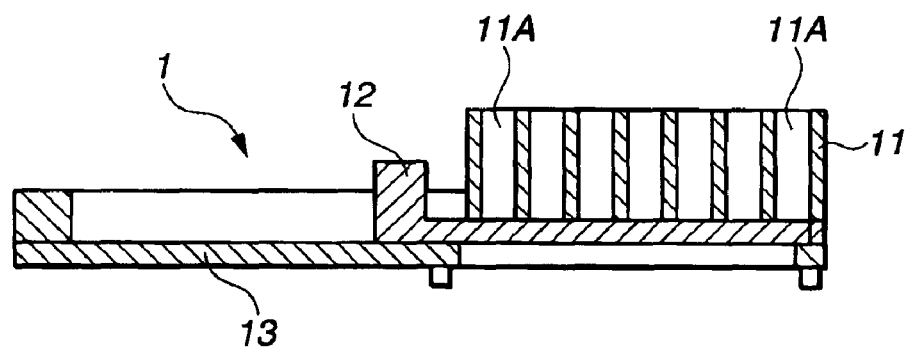

It has already been noted above that the base 13 is integrally molded with the charging member 11. In addition, as shown in FIG. 1b, the portion of the base 13 over which the charging holes 11A are situated is hollow.

The base 13 and the charging member 11 have formed therebetween a gap of a given size, within which the slide plate 12 is disposed so as to be freely slideable.

The slide plate 12 is designed so as to be freely movable from a condition in which the bottoms of the charging holes 11A are closed to a condition in which they are open.

Charging of the powdered molding materials into a compression mold using the foregoing type of charging device 1 and compression molding may be carried out as follows.

Figure 2A:
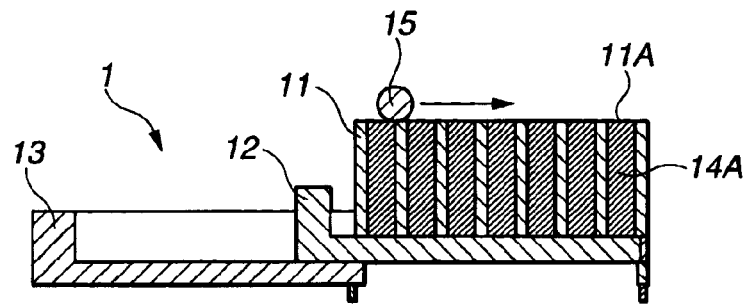
FIG. 2 shows schematic sectional views of individual steps involved in charging powdered material for dense areas according to the same embodiment of the invention.

As shown in FIG. 2a, a powdered molding material for dense areas 14A is charged into the charging holes 11A in the charging member 11, then is leveled off with a leveling rod 15, thereby filling each hole 11A with a given amount of the molding material 14A.

Figure 2B:
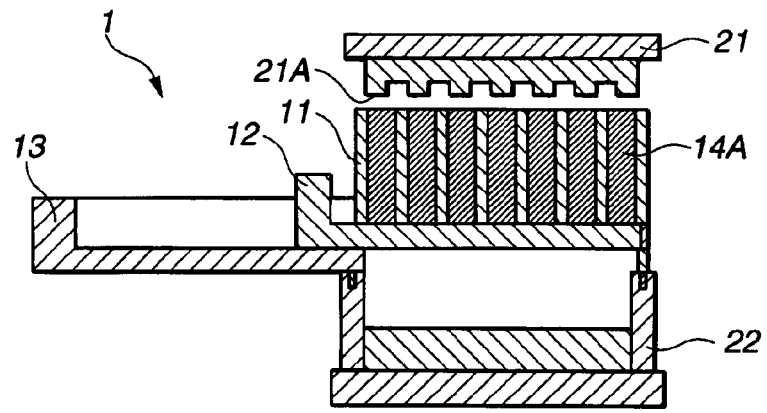

Next, as shown in FIG. 2b, the charging device 1 filled with the powdered molding material 14A is set on the bottom half 22 of a compression mold in a press having a top mold half 21 and bottom mold half 22. The top half 21 bears a pattern 21A for forming gas flow channels on the fuel cell separator.

Alternatively, a preform may instead be placed on the bottom half 22 of the mold.

Figure 2C:
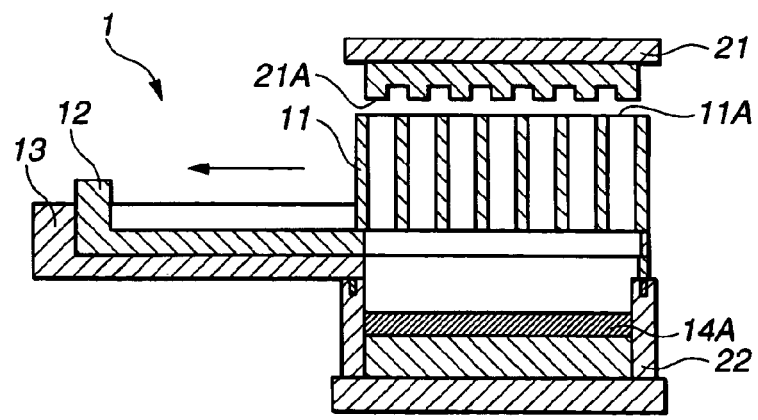

After the charging device 1 has been set on the bottom half 22 of the mold, as shown in FIG. 2c, the slide plate 12 is moved toward the left side in the diagram so as to open the bottoms of the charging holes 11A, allowing the powdered molding material for dense areas 14A filled into the holes to fall onto the bottom half 22 of the mold. The slide plate 12 is then returned to its original position.

Next, as shown in FIG. 3, the powdered material for dense areas 14A is filled in the same way as before into two rows of charging holes 11A on the left and right sides in the diagram, and powdered material for porous areas 14B is similarly filled into the remaining charging holes 11A.

Figure 3A:
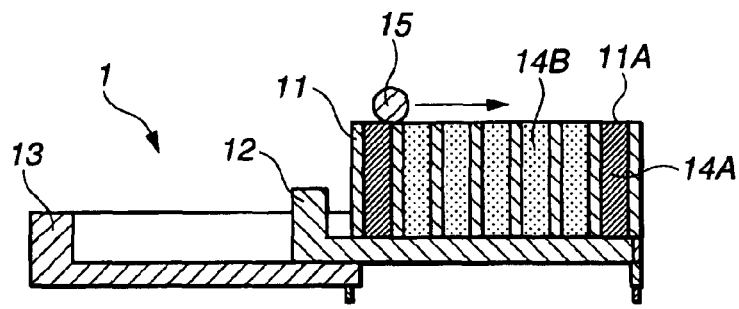
FIG. 3 shows schematic sectional views of individual steps, from charging of the powdered material for porous areas and dense areas to compression, according to the same embodiment of the invention.
Figure 3B:
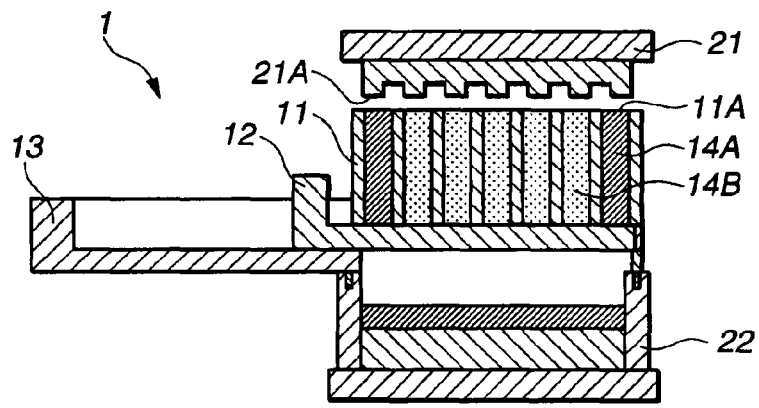
Figure 3C:
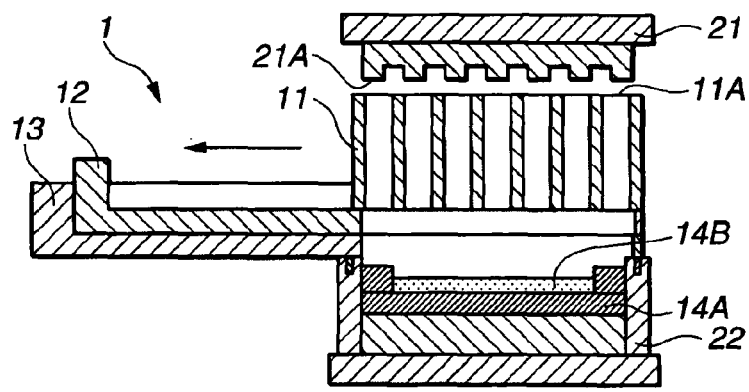

In this state, as shown in FIG. 3c, the slide plate is once again moved to the left so as to open the bottoms of the charging holes 11A, allowing the powdered material for dense areas 14A and the powdered material for porous areas 14B filled into these holes to fall onto the earlier charged powdered material for dense areas 14A.

These two charging operations leave powdered material for dense areas 14A charged onto the bottom and the left and right sides in FIG. 3c at the interior of the bottom half 22 of the mold, and leave powdered material for porous areas 14B charged into a center portion surrounded by the powdered material for dense areas 14A.

Figure 3D:
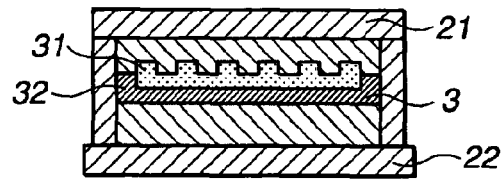
Figure 4:
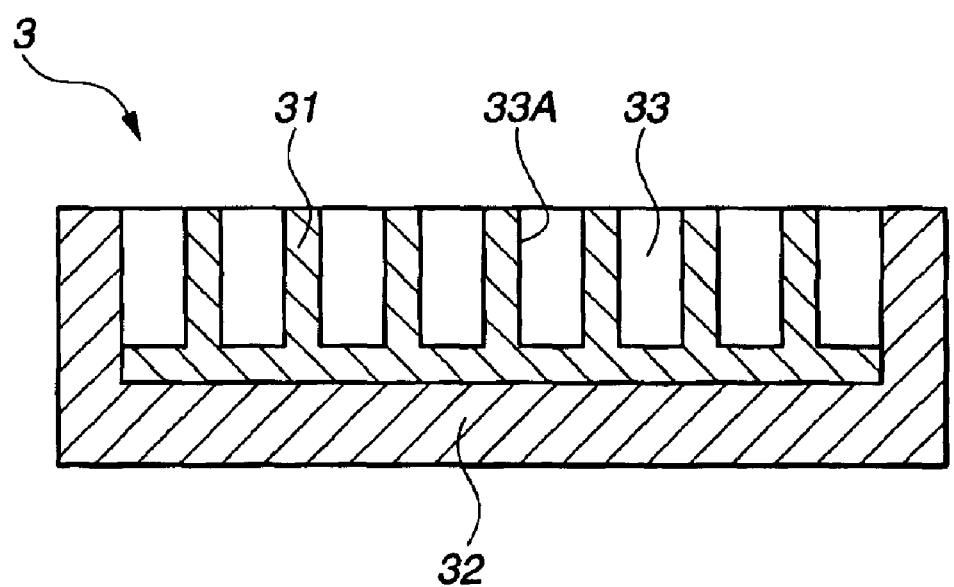
FIG. 4 is a schematic sectional view of a fuel cell separator according to the same embodiment.
Figure 5:
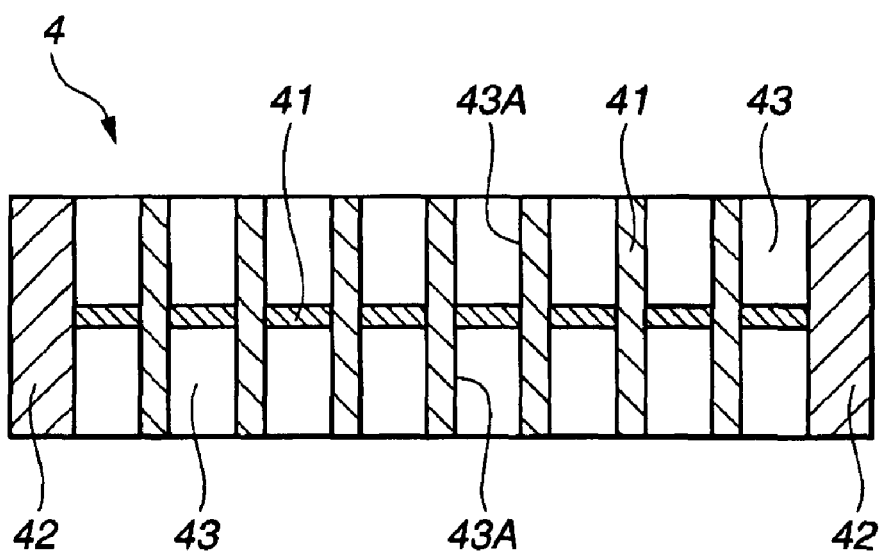
FIG. 5 is a schematic sectional view of a fuel cell separator according to a different embodiment of the invention.

Next, as shown in FIG. 3d, by clamping shut the mold in this state with the top half 21 thereof and compression molding at a mold temperature of, say, 100 to 250° C., and preferably 140 to 200° C., and a molding pressure of 0.098 to 19.6 MPa, there can be obtained a fuel cell separator 3 in which, as shown in FIG. 4, the areas surrounding the flow channel surfaces 33A of the gas flow channels 33 are porous areas 31 and the other areas are dense areas 32.

Charging of the respective powdered materials for dense areas and for porous areas is not limited to the particular charging positions and charging order of the foregoing embodiment. Indeed, any charging method may be employed provided some or all of the gas flow channel inside surfaces are formed in porous areas of a fuel cell separator having porous areas and dense areas.

Nor is the separator shape limited to that in the above embodiment, so long as the separator has a shape that enables it to be used as a fuel cell separator. shape. Here, a separator 4 has gas flow channels 43 formed on both surfaces. The areas surrounding the flow channel surfaces 43A of the gas flow channels 43 are porous areas 41, and the other areas are dense areas 42.

As described above, in the fuel cell separator having porous areas and dense areas of the present invention, because some or all of the gas flow channel surfaces are formed in porous areas, a decline in power generating efficiency due to obstruction of the gas flow channels by water produced during power generation can be prevented and contact resistance can be minimized. Moreover, because the separator has dense areas, the strength of the separator as a whole can be maintained, giving the separator a high durability to stress or impact when the unit cells are clamped together during assembly of the fuel cell stack.

Moreover, manufacture of the fuel cell separator of the invention by a compression molding process in which the above-described charging device is used enables fuel cell separators having porous areas only in required places to be easily obtained and also enables porous areas and dense areas to be integrally molded, thus making it possible to increase the bond strength at boundaries between the respective areas and prevent boundary separation.

Furthermore, because the separator is manufactured in a single molding operation using materials of similar quality, the manufacturing process can be simplified, enabling the cost of manufacturing fuel cell separators to be reduced.

The solid polymer fuel cell of the invention is made up of a plurality of stacked unit cells. Each unit cell is composed of a solid polymer membrane, a pair of electrodes disposed on either side of the polymer membrane, and a pair of separators disposed on either side of the pair of electrodes such as to form flow channels for the supply and removal of gases. Some or all of the separators within the fuel cell are the above-described fuel cell separators according to the present invention.

Specifically, it is advantageous for at least 50%, preferably 50 to 100%, more preferably 70 to 100%, and most preferably 80 to 100%, of all the separators in the fuel cell to be fuel cell separators according to the invention. If fuel cell separators according to the invention account for too low a proportion of all the separators in the fuel cell, the energy output by the fuel cell may decrease with continuous operation over an extended period of time, making it difficult to achieve the objects and advantages of the invention. Those separators used in the fuel cell which are not fuel cell separators according to the present invention may be separators of a type commonly employed in fuel cells.

The solid polymer electrolyte membrane may be of a type which is commonly used in solid polymer fuel cells. Illustrative examples include proton-conducting ion-exchange membranes created from fluorocarbon resins, and specifically a polytrifluorostyrene sulfonic acid or a perfluorocarbonsulfonic acid (NAFION™). The surface of the electrolyte membrane is typically coated with a paste composed of a catalyst-supporting carbon powder dispersed in an organic solvent such as a perfluorocarbonsulfonic acid-containing lower fatty alcohol-water mixed solution (NAFION™solution). The catalyst supported by the carbon powder is generally platinum or an alloy of platinum with another metal.

The pair of electrodes situated on either side of the solid polymer electrolyte membrane may be made of, for example, carbon paper, carbon felt, or carbon cloth woven from carbon fiber yarn.

The electrolyte membrane and electrodes are integrally united by sandwiching the electrolyte membrane between the pair of electrodes and bonding under heat (120 to 130° C.) and pressure.

Alternatively, the electrolyte membrane and the pair of electrodes may be united by bonding with an adhesive.

The resulting electrode/electrolyte membrane/electrode laminate is then mounted between a pair of separators such as to form flow channels capable of supplying and removing the fuel gas, thereby forming a unit cell. Mounting may be carried out by, for example, applying an adhesive to the areas of the separator, specifically the ribs, which come into contact with the electrodes.

By using the inventive fuel cell separator as some (preferably at least 50%) or all of the separators in the solid polymer fuel cell of the invention, the fuel cell is able to maintain a stable power generating efficiency over a long period of time, resulting in a high operating efficiency. The solid polymer fuel cell of the invention is thus particularly suitable as a mobile power source such as in automobiles and small boats.

EXAMPLES

The following examples and comparative examples are provided to illustrate the invention and are not intended to limit the scope thereof. Average particle sizes given below were measured using a particle size analyzer sold under the tradename MICROTRAK.

Example 1

A powdered molding material for dense areas having a particle size of 1.0 mm or less was prepared by mixing 81 parts by weight of artificial graphite powder having an average particle size of 60 $\mu$m and 19 parts by weight of phenolic resin to form a composition, granulating and drying the composition, then screening the dried composition.

A powdered molding material for porous areas having a particle size of 0.5 mm or less was prepared by mixing 90 parts by weight of artificial graphite powder having an average particle size of 60 $\mu$m and 10 parts by weight of phenolic resin to form a composition, granulating and drying the composition, then screening the dried composition.

The above powdered material for dense areas was charged into the charging holes 11A of a charging device 1 and leveled off at the top of the holes with a leveling rod 15 to fill each hole in the manner shown in FIGS. 1 and 2. Next, a slide plate 12 was moved so as to open the bottom of the charging holes 11A, thereby charging the powdered molding material for dense areas 14A onto the bottom half 22 of a compression mold, following which the slide plate 12 was returned to its original position.

In this example, there were a total of 36 charging holes 11A, each having a cross-sectional size of 15×15 mm.

Next, as shown in FIG. 3, the charging holes 11A in the two rows on the left and right sides in FIG. 3 were charged in the same way as before with the powdered material for dense areas 14A, and the remaining charging holes 11A were similarly charged with the powdered material for porous areas 14B.

The slide plate 12 was then moved again to open the bottom of the charging holes 11A, thereby allowing the powdered material for dense areas 14A and the powdered material for porous areas 14B filled therein to fall onto the earlier charged powdered material for dense areas 14A.

As shown in FIG. 3c, these two charging operations left powdered material for dense areas 14A charged onto the bottom and the left and right sides at the interior of the bottom half 22 of the mold, and left powdered material for porous areas 14B charged into a center portion surrounded by the powdered material for dense areas 14A.

The top half 21 of the mold was then clamped shut over the bottom half 22 and compression molding was carried out at a mold temperature of 170° C. and a molding pressure of 10 MPa to form a fuel cell separator in which, as shown in FIG. 4, the areas surrounding the flow channel surfaces 33A of the gas flow channels 33 were porous areas 31 and the other areas were dense areas 32.

The resulting fuel cell separator was then subjected to hydrophilizing treatment that involved impregnation with an aqueous solution of the water-soluble epoxy compound Denacol EX1310 (produced by Nagase ChemteX Corporation) under a reduced pressure of −0.07 MPa to form a hydrophilic substance layer on the separator surface, followed by curing at 140° C.

Example 2

A powdered molding material for dense areas was prepared in the same way as in Example 1.

A powdered molding material for porous areas having a particle size of 0.8 mm or less was prepared by mixing 80 parts by weight of artificial graphite powder having an average particle size of 60 µm, 10 parts by weight of phenolic resin and 10 parts by weight of carbon fibers to form a composition, granulating and drying the composition, then screening the dried composition.

Using these powdered materials, a fuel cell separator was obtained in the same way as in Example 1. The fuel cell separator was then subjected to hydrophilizing treatment as in Example 1.

Example 3

A powdered molding material for dense areas was prepared in the same way as in Example 1.

A powdered molding material for porous areas having a particle size of 0.5 mm or less was prepared by mixing 75 parts by weight of artificial graphite powder having an average particle size of 60 µm, 15 parts by weight of phenolic resin and 10 parts by weight of activated carbon to form a composition, granulating and drying the composition, then screening the dried composition.

Using these powdered materials, a fuel cell separator was obtained in the same way as in Example 1. The fuel cell separator was then subjected to hydrophilizing treatment as in Example 1.

Example 4

A powdered molding material for dense areas was prepared in the same way as in Example 1.

A powdered molding material for porous areas having a particle size of 0.5 mm or less was prepared by mixing 78 parts by weight of artificial graphite powder having an average particle size of 60 µm, 12 parts by weight of phenolic resin and 10 parts by weight of activated alumina to form a composition, granulating and drying the composition, then screening the dried composition.

Using these powdered materials, a fuel cell separator was obtained in the same way as in Example 1. The fuel cell separator was then subjected to hydrophilizing treatment as in Example 1.

Example 5

A powdered molding material for dense areas having a particle size of 1.0 mm or less was prepared by mixing 83 parts by weight of natural graphite powder having an average particle size of 30 µm and 17 parts by weight of phenolic resin to form a composition, granulating and drying the composition, then screening the dried composition.

A powdered molding material for porous areas having a particle size of 0.5 mm to 1.0 mm was prepared by mixing 86 parts by weight of artificial graphite powder having an average particle size of 20 µm and 14 parts by weight of phenolic resin to form a composition, granulating and drying the composition, then screening the dried composition.

Using these powdered materials, a fuel cell separator was obtained in the same way as in Example 1. The fuel cell separator was then subjected to hydrophilizing treatment as in Example 1.

Example 6

A powdered molding material for dense areas was prepared in the same way as in Example 5.

A powdered molding material for porous areas having a particle size of 0.5 mm to 1.0 mm was prepared by mixing 79 parts by weight of artificial graphite powder having an average particle size of 20 µm, 14 parts by weight of phenolic resin and 5 parts by weight of carbon fibers to form a composition, granulating and drying the composition, then screening the dried composition.

Using these powdered materials, a fuel cell separator was obtained in the same way as in Example 1. The fuel cell separator was then subjected to hydrophilizing treatment as in Example 1.

Example 7

A powdered molding material for dense areas was prepared in the same way as in Example 5.

A powdered molding material for porous areas having a particle size of 0.5 mm to 1.0 mm was prepared by mixing 76 parts by weight of artificial graphite powder having an average particle size of 20 µm, 14 parts by weight of phenolic resin and 10 parts by weight of activated alumina to form a composition, granulating and drying the composition, then screening the dried composition.

Using these powdered materials, a fuel cell separator was obtained in the same way as in Example 1. The fuel cell separator was then subjected to hydrophilizing treatment as in Example 1.

Comparative Example 1

A powdered material for dense areas was prepared in the same way as in Example 1.

This powdered material for dense areas was charged into the charging holes 11A of a charging device 1 then leveled off with a leveling rod 15 to fill each hole in the manner shown in FIGS. 1 and 2. A slide plate was then moved toward the left in FIG. 2, thereby opening the bottom of the charging holes 11A and charging the powdered material for dense areas onto the bottom half 22 of a mold.

The top half 21 of the mold was subsequently clamped shut over the bottom half 22 and compression molding was carried out at 170° C. and 30 MPa to form a fuel cell separator. The separator was then subjected to hydrophilizing treatment in the same way as in Example 1.

Comparative Example 2

A powdered material for dense areas was prepared in the same way as in Example 5. This powdered material was used to manufacture a fuel cell separator in the same way as in Comparative Example 1. The fuel cell separator was then subjected to hydrophilizing treatment as in Example 1.

Comparative Example 3

A powdered molding material for dense areas having a particle size of 0.5 mm or less was prepared by mixing 71 parts by weight of synthetic graphite powder having an average particle size of 60 µm, 19 parts by weight of phenolic resin and 10 parts by weight of activated carbon to form a composition, granulating and drying the composition, then screening the dried composition.

This powdered material for dense areas was charged into the charging holes 11A of a charging device 1 then leveled off with a leveling rod 15 to fill each hole in the manner shown in FIGS. 1 and 2. A slide plate 12 was then moved toward the left in FIG. 2, thereby opening the bottom of the charging holes 11A and charging the powdered material for dense areas onto the bottom half 22 of a mold.

The top half 21 of the mold was subsequently clamped shut over the bottom half 22 and compression molding was carried out at 170° C. and 10 MPa to form a fuel cell separator.

Comparative Example 4

A powdered molding material for dense areas having a particle size of 0.5 mm or less was prepared by mixing 71 parts by weight of synthetic graphite powder having an average particle size of 60 μm, 19 parts by weight of phenolic resin and 10 parts by weight of titanium oxide to form a composition, granulating and drying the composition, then screening the dried composition.

This powdered material was used to manufacture a fuel cell separator in the same way as in Comparative Example 1.

The fuel cell separators obtained in each of the above examples and comparative examples were subjected to the measurement or evaluation of gas flow channel water absorption time and porosity, specific resistance, contact resistance, impact resistance, and ability to discharge water during power generation. The methods used are described below, and the results are presented in Table 1.

1. Water Absorption Time

The fuel cell separator was placed in a constant temperature tank set to 80% humidity, 0.0025 g of ion-exchanged water was deposited on the surface of the separator in the area of the gas flow channels, and the time required for the water to be absorbed by the separator surface was measured.

2. Porosity

Measured by mercury injection porosimetry.

3. Specific Resistance

Measured by the four-probe method described in JIS H-0602.

4. Contact Resistance

The separator was placed between two smooth gold-plated copper plates, and the contact resistance was measured from the voltage drop across the plates when a constant current was passed through.

5. Impact Resistance

Unit cells containing the separator obtained in the respective examples were assembled into a stack, and the resulting fuel cell module was shaken 1,000 times as described in JIS D-1601. After shaking, the separators were examined. In Table 1, an impact resistance rating of "good" indicates that no separator breakage occurred; a rating of "poor" indicates that separator breakage was observed.

6. Water Discharge

The discharge of water produced during power generation was evaluated.

TABLE 1

| | Water absorption time in gas flow channels (seconds) | Porosity of gas flow channels (%) | Specific resistance (mΩ · cm) | Contact resistance (mΩ · cm²) | Impact resistance | Discharge of water during power generation |
|---|---|---|---|---|---|---|
| Example 1 | 65 | 22 | 7.6 | 3.9 | good | good |
| Example 2 | 60 | 15 | 9.5 | 5.1 | good | good |
| Example 3 | 5 | 25 | 15 | 10 | good | good |
| Example 4 | 4 | 24 | 9 | 4.2 | good | good |
| Example 5 | 30 | 20 | 6.5 | 3.7 | good | good |
| Example 6 | 25 | 16 | 12 | 4.0 | good | good |
| Example 7 | 4 | 22 | 10 | 3.8 | good | good |
| Comparative Example 1 | water not absorbed | 0 | 8.1 | 6.7 | good | water collected in channels |
| Comparative Example 2 | water not absorbed | 0 | 13 | 8.3 | good | water collected in channels |
| Comparative Example 3 | 5 | 25 | 17 | 21 | poor | good |
| Comparative Example 4 | water not absorbed | 0 | 14 | 8.5 | good | water collected in channels |

As is apparent from the results in Table 1, in the fuel cell separators obtained in each of the above examples according to the invention, the gas flow channels were formed in porous areas and thus had a high water absorptivity and excellent water discharge properties. These separators also had a low specific resistance and a low contact resistance. Moreover, because they had also dense areas, these separators exhibited an excellent impact resistance.

In the inventive fuel cell separators having porous areas and dense areas, the formation of some or all of the gas flow channel surfaces in porous areas makes it possible to both prevent obstruction of the gas flow channels by water produced during power generation and to minimize contact resistance. Moreover, the presence of dense areas in these same separators enables the strength of the separator as a whole to be maintained, resulting in a high durability to stress and impact when the units cells containing the separators are clamped together during assembly of the fuel cell stack.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A fuel cell separator comprising porous areas, dense areas and gas flow channels;
    wherein the flow channels are defined by flow channel surfaces, at least some of which flow channel surfaces are formed in the porous areas, and wherein the porous areas have a porosity of 5 to 50%.

2. The fuel cell separator of claim 1, wherein the porous areas have a porosity of 10 to 30%.

3. The fuel cell separator of claim 1, wherein the porous areas are hydrophilically treated.

4. A solid polymer fuel cell comprising a plurality of stacked unit cells, each unit cell being composed of a solid polymer membrane, a pair of electrodes disposed on either side of the polymer membrane, and a pair of separators disposed on either side of the pair of electrodes such as to form flow channels for supplying and removing gases;
    wherein at least some of the separators within the fuel cell are fuel cell separators according to claim 1.

* * * * *